United States Patent
Stöppelmann

(10) Patent No.: US 11,065,854 B2
(45) Date of Patent: Jul. 20, 2021

(54) FLEXIBLE PLASTIC LINE, METHOD FOR THE PRODUCTION THEREOF, AND USES OF SAME

(71) Applicant: EMS-PATENT AG, Domat/Ems (CH)

(72) Inventor: Georg Stöppelmann, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 16/956,002

(22) PCT Filed: Dec. 20, 2018

(86) PCT No.: PCT/EP2018/086274
§ 371 (c)(1),
(2) Date: Jun. 19, 2020

(87) PCT Pub. No.: WO2019/122175
PCT Pub. Date: Jun. 27, 2019

(65) Prior Publication Data
US 2021/0086491 A1    Mar. 25, 2021

(30) Foreign Application Priority Data
Dec. 22, 2017    (EP) .................................. 17209971

(51) Int. Cl.
| | |
|---|---|
| *B32B 27/32* | (2006.01) |
| *B32B 27/08* | (2006.01) |
| *B32B 27/22* | (2006.01) |
| *B32B 27/20* | (2006.01) |
| *B32B 27/30* | (2006.01) |
| *B32B 27/34* | (2006.01) |

(Continued)

(52) U.S. Cl.
CPC .............. *B32B 27/322* (2013.01); *B32B 1/08* (2013.01); *B32B 27/08* (2013.01); *B32B 27/20* (2013.01);

(Continued)

(58) Field of Classification Search
CPC ....... B32B 27/322; B32B 27/34; B32B 27/08; B32B 27/22; B32B 27/20; B32B 27/306;
(Continued)

(56) References Cited

U.S. PATENT DOCUMENTS

| | | |
|---|---|---|
| 4,251,424 A | 2/1981 | Pagilagan |
| 2003/0220449 A1 | 11/2003 | Jacques et al. |

(Continued)

FOREIGN PATENT DOCUMENTS

| | | |
|---|---|---|
| EP | 0 445 706 A2 | 9/1991 |
| EP | 1 036 968 A1 | 9/2000 |

(Continued)

OTHER PUBLICATIONS

International Search Report for PCT/EP2018/086274 dated Mar. 14, 2019 [PCT/ISA/210].

(Continued)

*Primary Examiner* — Michael C Miggins
(74) *Attorney, Agent, or Firm* — Sughrue Mion, PLLC

(57) ABSTRACT

A plastics line (1) is described with at least one layer (5) consisting of the following components:
(A) 70-94 weight percent of a polyamide selected from the following group: polyamide 516, polyamide 616, polyamide 1016 or mixtures thereof;
(B) 4-20 weight percent impact modifier;
(C) 2-15 weight percent of plasticiser;
(D) 0-5 weight percent of additives different from (B) and (C),
wherein the sum of (A)-(D) is 100 weight percent, and with the proviso that layer (5) does not contain polyamide 6, as well as a method of manufacturing such a plastic pipe and uses of such a plastic pipe.

34 Claims, 1 Drawing Sheet

(51) Int. Cl.
*F16L 9/12* (2006.01)
*F16L 11/04* (2006.01)
*B32B 1/08* (2006.01)

(52) U.S. Cl.
CPC ............ *B32B 27/22* (2013.01); *B32B 27/306* (2013.01); *B32B 27/34* (2013.01); *F16L 9/12* (2013.01); *F16L 11/04* (2013.01); *B32B 2250/03* (2013.01); *B32B 2270/00* (2013.01); *B32B 2307/7265* (2013.01); *B32B 2597/00* (2013.01); *B32B 2605/00* (2013.01); *F16L 2011/047* (2013.01)

(58) Field of Classification Search
CPC .................. B32B 1/08; B32B 2270/00; B32B 2307/7265; B32B 2250/03; B32B 2597/00; B32B 2605/00; F16L 9/12; F16L 11/04; F16L 2011/047
See application file for complete search history.

(56) References Cited

U.S. PATENT DOCUMENTS

| | | |
|---|---|---|
| 2006/0074158 A1 | 4/2006 | Blondel et al. |
| 2009/0269532 A1 | 10/2009 | Ferreiro et al. |
| 2011/0220236 A1* | 9/2011 | Kettl ........................ C08L 77/06 138/137 |
| 2014/0246111 A1 | 9/2014 | Zimmer et al. |
| 2015/0353792 A1 | 12/2015 | Montanari et al. |

FOREIGN PATENT DOCUMENTS

| | | |
|---|---|---|
| EP | 1 162 061 A1 | 12/2001 |
| EP | 1 182 345 A1 | 2/2002 |
| EP | 1 216 826 A2 | 6/2002 |
| EP | 1 452 307 A1 | 9/2004 |
| EP | 1 645 412 A1 | 4/2006 |
| EP | 1 884 356 A1 | 2/2008 |
| EP | 2 366 539 A1 | 9/2011 |
| EP | 2 842 736 A1 | 3/2015 |
| GB | 2 390 658 A | 1/2004 |

OTHER PUBLICATIONS

Written Opinion for PCT/EP2018/086274 dated Mar. 14, 2019 [PCT/ISA/237].

* cited by examiner

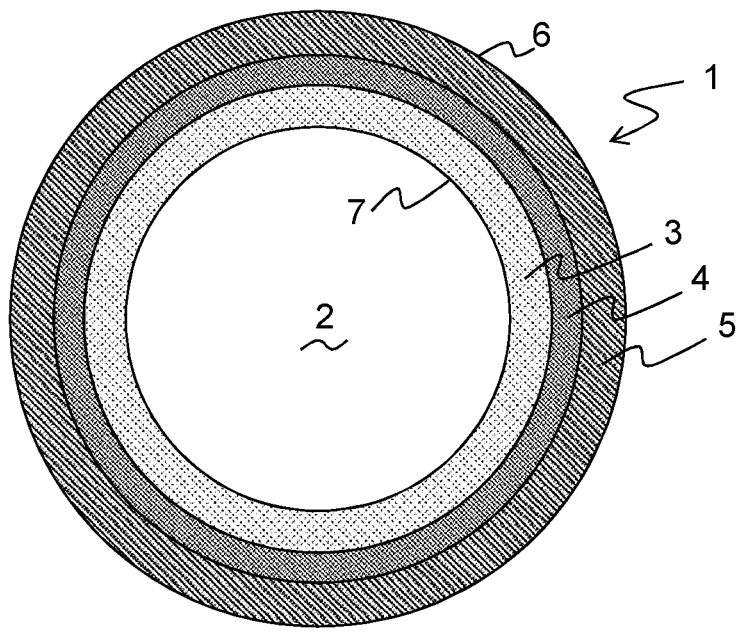

FLEXIBLE PLASTIC LINE, METHOD FOR THE PRODUCTION THEREOF, AND USES OF SAME

CROSS REFERENCE TO RELATED APPLICATIONS

This application is a National Stage of International Application No. PCT/EP2018086274 filed Dec. 20, 2018, claiming priority based on European Patent Application No. 17209971.5 filed Dec. 22, 2017.

TECHNICAL FIELD

The present invention relates to a line/tube made of thermoplastic material, in particular for fuels in the automotive sector, a process for manufacturing such a line and uses of such lines.

PRIOR ART

The use of fuel lines based on layer structures of plastics, especially polyamide, has been state of the art for some time. Due to the requirements in terms of permeability for fuels as well as the required mechanical properties (e.g. impact strength, elongation at break) and chemical resistance both internally and externally at a wide range of temperatures, multi-layer pipes are preferred. These pipes are characterised by high thermal load capacity, high length stability and high resistance to the fuels carried in them. Relevant here is, among other things, a low permeation value, whereby this low permeation value must be given not only for the fuel itself, but also for any additives or other minor components contained therein. In addition, resistance to the washing out of components or parts of the multi-layer structure is required.

Fuel lines for vehicles are known from US-A-2014/246111. Here the lines have at least five layers and include barrier layers, adhesion promoter layers and other functional layers. In particular, a layer of fluoropolymer is provided on the inside and a layer of EVOH (ethylene vinyl alcohol copolymer) is provided as a barrier layer.

EP-A-1 645 412 describes lines for fuel cells made of thermoplastic materials. A layer of a polyamide moulding compound is suggested as the inner layer, and a wide variety of suggestions are made for possible subsequent layers, including EVOH layers. Concrete examples of layer structures are not given, and in order to ensure a bond between any EVOH layer and the polyamide inner layer, the need for an adhesion promoter in the form of a separate additional layer is expressly mentioned.

US-A-2009/269532 describes a line consisting of at least two layers, both of polyamide, the core element being to provide the inner layer only with an organic stabiliser and explicitly not with a copper stabiliser As an advantage, it is emphasized that such structures are improved against aging, especially in contact with hot air, compared to the state of the art and are more resistant in contact with corrosive liquids. As far as three-layer structures with a central EVOH layer are disclosed at all, these always have organic stabilization on the inside and copper stabilization on the outside.

US-A-2015/353792 describes adhesion promoter materials for use in applications such as multilayer fuel lines. It proposes complex copolyamides of the general structure A/B/C, for example of type 6/612/12, and shows that adhesion between two different polyamide layers can be guaranteed.

EP-A-0 445 706 proposes layer structures as fuel lines, which have at least three layers of at least two different polyamides. As a comparative example, a layered structure with an inner layer of impact modified polyamide 6, an intermediate layer of EVOH and an outer layer of impact modified polyamide 6 is worked and it is shown that such a structure is not sufficiently resistant to cold impact.

Among other things, from GB 2390658 a fuel line is known with an EVOH barrier layer with an inner layer of polyamide 6 and an outer layer of polyamide 612, or with an inner layer and outer layer of polyamide 612. 150% elongation at break is achieved. The inner layer is preferably made of polyamide 612 or 610 and is directly adjacent to the EVOH layer. In particular, structures are disclosed in which only three layers are present and in which the outer layers consist exclusively of polyamide 610, or polyamide 612 or polyamide 6.

From EP-A-1 036 968, fuel lines are known which have at least four layers, including a barrier layer of EVOH, and, as an adhesion promoter layer to an outermost layer of polyamide 12 or polyamide 11, a layer based on lactam or amino acid or based on polyamide 69.

From EP-A-1 216 826, a multilayer composite with an EVOH layer is known to be used as a fuel line, wherein a polyamide-polyamine copolymer is proposed as the material for an adhesion promoter layer to an outer layer, in particular based on polyamide 12. Due to the apparently observed poor adhesion of polyamides to EVOH, it is proposed to design a polyamide-based layer directly adjacent to the EVOH barrier layer as a special blend, whereby a plurality of polyamides as well as the presence of a polyamine-polyamide copolymer is considered necessary to ensure good adhesion in the first place even during prolonged contact with fuels. In the specific examples, the inner layer is always designed as a polyamide 6 layer due to the required resistance to fuels. Although further possibilities of other polyamides are described, no reference is made to specifically preferred polyamides, e.g. with regard to particularly good adhesion to the barrier layer on the one hand and resistance to specific chemicals on the other.

Another state of the art fuel line is described in EP-A-1 452 307, which also provides an EVOH-based barrier layer and, in order to ensure adhesion to the barrier layer and good resistance to peroxide, it is specifically proposed that the inner layer should not be based on a polyamide 6 homopolymer but on a blend of polyamide homopolymers containing a compatibilizer. Here too, different polyamide homopolymers are specified, but generally without giving specific details as to which polyamide homopolymers exhibit particularly good adhesion to the barrier layer and resistance to specific chemicals.

Furthermore, reference is made to the two documents EP-A-1 036 968 and EP-A-1 162 061, which also describe thermoplastic multilayer composites that have a layer of EVOH as a barrier layer. Adjacent to this layer, EP-A-1 162 061 describes a layer of a moulding compound based on polyamide, whereby a large number of possible polyamides are given in general terms. However, only an inner layer of polyamide 6 is specifically disclosed in the examples. In EP-A-1 036 968, special attention is paid to the fact that copolyamides exhibit improved adhesion to EVOH barrier layers. As inner layers, layers of blends of polyamide and polyolefin or polyamide layers are always given.

US-A-2003/0220449 concerns a moulding compound of polyamide 11 or polyamide 12 with a plasticiser and optional NBR rubber. The effect on crystallinity under vacuum is described. EP-A-2 366 539 concerns two-layer plastic pipes for pressurised liquids Moulding compounds made of polyamide 612 with impact modifiers are used. Two layers are required, both based on polyamide 612, with a blend of partially crystalline polyolefin and synthetic olefinic rubber added to the inner layer.

US-A-2006/0074158 describes homo- and copolyamides for flexible moulded parts. For example, a molded line suitable for fuels contains a polyamide 1010 with plasticizer.

EP-A-2 842 736 describes a compressed air brake line. The outer layer is based on polyamide 11 or polyamide 12 and a second inner layer is described here. Inner layers based on polyamide 11, polyamide 12, polyamide 612 and polyamide 1012 are worked.

U.S. Pat. No. 4,251,424 describes a plasticized polyamide 612 with a substantial proportion of an olefinic polymer or impact modifier of 10 to 40 weight percent to achieve good zinc chloride resistance.

EP-A-1182345 describes a fuel line for vehicles consisting of: an outer layer of polyamide 12; an intermediate layer of ethylene vinyl alcohol copolymer; and an inner layer of polyamide 6. The inner layer is made conductive by adding up to 30 weight percent of carbon black or graphite.

EP-A-1884356 describes a thermoplastic multilayer composite in the form of an extruded hollow profile comprising a thermoplastic outer layer and at least one further layer, the outer layer being formed from a mixture based on at least one polyamide (PA) and 20 to 80 parts by weight of at least one polyamide elastomer (TPE-A), and the hollow profile was produced at extrusion speeds of more than 20 m/min, so that the hollow profile produced has a higher elongation at break of more than 200% compared with an otherwise identical hollow profile produced at lower extrusion speeds.

EXPOSITION OF THE INVENTION

A decrease in the amount of plasticizer by extraction and/or leaching leads to embrittlement of the parts produced from a molding compound. Therefore, extraction or washing out of the additives should be avoided.

It is the purpose of the present invention to produce an improved flexible line based on or made of a polyamide moulding compound with low migration and leaching of additives, as well as good notched impact strength. It is therefore a line, which has very good bursting pressure values and low washout. In addition, advantageous resistance to zinc chloride despite the small proportion of impact modifier, which allows the moulding compound according to the invention to be widely used as an outer layer (or mono-pipe) in pipes, especially but not only for fuels.

Surprisingly, the pipe according to the invention shows very good bursting pressure values at elevated temperature.

Specifically, the present invention concerns a plastics line with at least one layer consisting of the following components:

(A) 70-94 weight percent of a polyamide selected from the following group: polyamide 516, polyamide 616, polyamide 1016 or mixtures thereof;
(B) 4-20 weight percent impact modifier;
(C) 2-15 weight percent, preferably 2-9 weight percent, of plasticiser;
(D) 0-5 weight percent of additives different from (B) and (C),
wherein the sum of (A)-(D) is 100 weight percent.

This with the proviso that the layer does not contain any polyamide 6, not even as part of component (D).

A first preferred design of such a plastics line is characterised in that the at least one impact modifier (B) is selected as an acid modified ethylene-α olefin copolymer. This in particular preferably as an ethylene/α-olefin copolymer grafted with an acid anhydride, in particular with maleic anhydride, in particular ethylene/butylene, ethylene/propylene or ethylene-propylene/ethylene-butylene copolymer modified or grafted in this way.

The proportion of impact modifier (B) is typically in the range of 5-18 weight percent, preferably in the range of 10-16 weight percent or in the range of 12-15 weight percent. The at least one plasticizer (C) may be selected more preferably as a hydroxybenzoic acid ester (such as 2-hexyldecyl-4-hydroxybenzoate, HDPB) and/or sulfonamide-based plasticizer, preferably of the class of N-substituted sulfonamide plasticizers, in particular preferably as BBSA. Hydroxybenzoic acid ester-based plasticizers include systems such as the following: 2-hexyldecyl-4-hydroxybenzoate, hexyloxyethoxyethyl p-hydroxybenzoate; hexyloxypropoxypropyl p-hydroxybenzoate; hexyloxybutoxybutyl p-hydroxybenzoate; octyloxyethoxyethyl p-hydroxybenzoate; octyloxypropoxypropyl p-hydroxybenzoate; octyloxybutoxybutyl p-hydroxybenzoate; 2'-ethylhexyloxyethoxyethyl p-hydroxybenzoate; 2'-ethylhexyloxypropoxypropyl p-hydroxybenzoate; 2'-ethylhexyloxybutoxybutyl p-hydroxybenzoate; decyloxyethoxyethyl p-hydroxybenzoate; decyloxypropoxypropyl p-hydroxybenzoate; decyloxybutoxybutyl p-hydroxybenzoate, or mixtures thereof.

The plastics line can be characterized by the fact that the proportion of plasticizer (C) is in the range of 2-9 or 4-8 percent by weight, preferably in the range of 4.5-7 or 4.5-6 percent by weight.

The at least one polyamide (A) is preferably selected as polyamide 616.

The polyamide (A) preferably has a relative solution viscosity, measured in m-cresol according to ISO 307 (2007) at a temperature of 20° C. in the range 2.0-2.4, preferably 2.05-2.35.

Furthermore, preferably the at least one polyamide (A) has a melting point in the range of 175-240° C., preferably 190-215° C.

The proportion of additives (D) in the plastic line is preferably in the range of 0.1-3 weight percent, preferably in the range of 0.5-1 weight percent.

In general, the additives (D) of the layer are preferably selected from at least one additive of the following group: antioxidants, processing aids, UV stabilizers, heat stabilizers, pigments, masterbatch carriers, conductivity additives, slip agents or mixtures thereof.

In particular, the plastic pipe is preferably in the form of a multi-layer composite, namely in the form of a hollow body enclosing an interior space, and the layer then preferably forms the outer layer that closes the multi-layer composite to the outside.

Such a multi-layer composite preferably consists of two or three layers, an inner layer adjoining the interior, in the case of two layers the outer layer adjoining the inner layer and in the case of three layers a middle layer adjoining the inner layer and the outer layer adjoining the middle layer. Adhesive layers are possible in this case but not necessary. Preferably, such a multi-layer composite does not require additional adhesion promoter layers.

The inner layer is preferably based on polyamide 6, especially for automotive applications. Furthermore, the middle layer is preferably based on EVOH.

The inner layer preferably has a copper stabilisation, preferably based on CuI (e.g. in the form of CuI/KI, preferably in a ratio of 1:4-1:8), in a proportion in the range of 0.01-0.10 weight percent, or in a proportion of 0.03-0.07 weight percent.

The inner layer may also contain an impact modifier, preferably in the range of 10-25 weight percent or in the range of 10-20 weight percent. Preferably the impact modifier is an acid modified ethylene-α olefin copolymer, in particular preferably an ethylene/α-olefin copolymer grafted with an acid anhydride, in particular with maleic anhydride, in particular ethylene/butylene, ethylene/propylene or ethylene-propylene/ethylene butylene copolymer modified or grafted in this way. The percentages by weight in each case are based on 100 percent by weight of the material used to produce the inner layer.

According to a particularly preferred design, the inner layer consists of
(A_I) Polyamide 6, preferably having a relative solution viscosity measured in sulphuric acid according to ISO 307 (2007) at a temperature of 20° C. in the range 3.5-3.8, preferably 3.6-3.75;
(B_I) 10-30 weight percent impact modifier
(C_I) 0.01-0.1 weight percent heat stabilizer, preferably based on copper (I)
(D_I) 0-1 weight percent of additives, preferably selected from the group consisting of: conductivity additives, crystallization accelerators, processing aids, lubricants, and mixtures thereof
the sum of the components (A_I)-(D_I) adding up to 100 percent by weight of the material used to produce the inner layer.

The middle layer is based on EVOH or consists of an EVOH, preferably an EVOH with an ethylene content in the range of 20-25 weight percent, preferably in the range of 25-30 weight percent.

The layer, especially if it is designed as an outer layer in a multi-layer composite, preferably has a thickness in the range of 0.3-0.6 mm, preferably in the range of 0.4-0.5 mm.

If present, the inner layer preferably has a thickness in the range 0.3-0.6 mm, preferably in the range 0.4-0.5 mm.

If present, the middle layer preferably has a thickness in the range 0.05-0.2 mm, preferably in the range 0.075-0.125 mm.

If a multi-layer composite is present, its total wall thickness is preferably in the range of 0.5-2.5 mm, preferably in the range of 0.75-1.5 mm.

Such a pipe is preferably produced in an extrusion process, or in the case of a plastic pipe in the form of a multi-layer composite, in a co-extrusion process.

Such a pipe can be designed as a corrugated pipe, at least in sections.

Such a line is used in particular as a line for combustion engines, especially in the automotive sector, especially for fuel, urea or coolant.

Furthermore, the present invention relates to a process for manufacturing a plastic pipe, which is characterized in that the at least one, or in the case of a plastic pipe in the context of a multi-layer composite, the two or three layers, are formed into a hollow body, in particular preferably into a pipe or a pipe or a container, in a continuous and/or discontinuous process, preferably in an extrusion blow moulding, a tandem extrusion, a sheathing process or a (co)extrusion process.

Other forms of execution are specified in the dependent claims.

SHORT DESCRIPTION OF THE DRAWINGS

Preferred embodiments of the invention are described in the following on the basis of the drawings, which are for explanatory purposes only and are not to be interpreted restrictively. In the drawings shows:

FIG. 1 a fuel line in a sectional view perpendicular to the direction of flow.

DESCRIPTION OF PREFERRED EMBODIMENTS

FIG. 1 shows an exemplary fuel line 1 according to the invention in a cross-section transverse to the main direction of flow.

The cross-sectional area can be constant over the main direction of travel, i.e. the pipe can have a substantially hollow cylindrical shape.

However, the cross-sectional area can also vary over the main direction, for example in the form of a corrugated pipe.

An interior 2 is enclosed by the pipe wall. The inner space 2 is first followed radially outwards by an inner layer 3, which borders on the inner space 2 with its inner surface 7 and delimits it. This inner layer is based on polyamide 6 without other polyamide components.

Directly adjacent to the inner layer 3 without an intermediate adhesion promoter layer is a middle layer 4 in the sense of a barrier layer, which is based on EVOH.

Directly adjacent to the outside of this middle layer 4 and again without an intermediate adhesion promoter layer is the outer layer 5, which is based on polyamide 616. The outer surface 6 of the outer layer 5 limits the line to the outside.
Starting Materials Used:
Polyamide 616 (outer layer):
$\eta_{rel}$=2.20 (0.5 weight percent in m-cresol);
$T_m$ measured with DSC according to ISO 11357 (2011) =196° C.
Polyamide 6 (inner layer):
$\eta_{rel}$=3.7 (1 weight percent in sulphuric acid);
$T_m$ measured with DSC according to ISO 11357 (2011) =222° C.
Polyamide 612 (outer layer, comparative example):
$\eta_{rel}$=2.3 (0.5 weight percent in m-cresol);
$T_m$ measured with DSC according to ISO 11357 (2011) =215-220° C.
Ethylene vinyl alcohol (barrier layer):
An ethylene/vinyl alcohol copolymer (EVOH) was used as material for the barrier layer. Specifically, the design examples involved a product of the company KURARAY, which is available under the name EVAL® under the product code F170B and has an ethylene content of 27 mol %. It is available in Europe from EVAL Europe N.V. in Zwijindrecht, Belgium.
Plasticizer (outer layer):
BBSA (N-butylbenzenesulphonamide) was used as the plasticiser (WM). This is available, for example, under the brand name Uniplex 214, from Lanxess.
Impact modifier (for inner and outer layer):
Acid-modified ethylene/α-olefin copolymers were used as impact modifiers (SZM), namely ethylene-butylene copolymers grafted with maleic anhydride.
Impact resistance modifier of the inner layer:
MVR value (measured at 230° C./2.16 kg) of 1.2 g/10 min,
DSC glass transition temperature, according to ISO standard 11357-2 (2013) of −65° C.,
available under the name Tafmer MH5020C from Mitsui Chemicals.
Impact modifier of the outer layer:
An olefinic impact modifier functionalized with maleic anhydride, blend of ethylene/propylene copolymer and ethylene/but-1-ene copolymer in a weight ratio of 67:33, grafted with 0.6 weight percent of maleic anhydride,
MVR value 1.3 g/10 min (measured at 230° C./2.16 kg),
DSC glass transition temperature, according to ISO standard 11357-2 (2013) of −60° C.,
available under the name Tafmer MC201 from Mitsui Chemicals.

Copper stabilizer (inner layer):

CuI/KI (1:6) was used as copper stabiliser in a proportion of 0.05 weight percent relative to the total mass of the inner layer. The copper (I) iodide, for example, is commercially available from the company William Blythe Ltd, and the potassium iodide from the company Liquichem Handelsgesellschaft mbH.

Masterbatch (outer layer):

Euthylene Black, soot-based (40%) colour masterbatch based on PE, available from BASF (Ludwigshafen, DE).

Production of the Test Specimens:

Pipes were co-extruded at mass temperatures between 210 and 260° C. under vacuum of −56 mbar and an extrusion speed of 32.8 m/min. Pipes with an outside diameter of 8 mm and a wall thickness of 1 mm were used as test specimens. The length of the pipe was adjusted according to the test requirements.

The following tests were carried out on the described pipe structures: Unless otherwise stated or specified by the standard, the measurements were carried out at 50% relative humidity.

Washing Out:

Test according to SAE J2260 with test fuel FAM-B (according to SAE J1681 (2000))—test 96 hours, 60° C. sealed tube of 200 cm; maximum extract according to VW TL 52712 6 g/m$^2$ and the upper limit of insoluble components is 0.7 g/m$^2$.

Zinc Chloride Test:

Test on a test piece of 30 cm length, according to SAE J2260 (2004) paragraph 7.12.2, after 200 hours in 50% w/w ZnCl$_2$ (aq.). A test for resistance to zinc chloride is considered passed as long as the pipe does not show any cracks or gaps after storage.

Tensile Strength and Modulus of Elasticity:

Have been measured according to ISO 527 at a tensile speed of 1 mm/min on an ISO 3167 compliant tensile bar.

Pipe Tensile Tests:

Pipe tensile tests were carried out according to ISO 527-2 (2012). Test specimens with a length of 150 mm (tensile tests in extrusion direction) or 10 mm (tensile tests transverse to extrusion direction) were used for tests. The test temperature is 23° C. and the test speed 100 mm/min (for tests in the direction of extrusion) or 25 mm/min if tests are carried out crosswise to the direction of extrusion.

Specifically, the following measurements were carried out according to ISO 527:

Elongation at max. tension (25 mm/min, transverse to extrusion direction), Maximum elongation stress (25 mm/min, transverse to extrusion direction), Elongation at max. tension (100 mm/min, in extrusion direction), Maximum elongation stress (100 mm/min, in extrusion direction).

Otherwise, the tests were carried out in accordance with the minimum requirements of the Volkswagen TL 52712 standard (2016), the test temperature being 23° C., unless otherwise expressly specified by the standard (i.e. for cold impact, appearance, washout rate).

Specifically, the following measurements were made according to TL 52712: breaking stress, transverse to the direction of extrusion (25 mm/min); elongation at break, transverse to the direction of extrusion (25 mm/min); yield stress, transverse to the direction of extrusion (25 mm/min); breaking stress in the direction of extrusion (100 mm/min); yield stress in the direction of extrusion (100 mm/min); elongation at break in the direction of extrusion (100 mm/min);

Cold Behaviour:

is tested in accordance with TL 52712 in line with VW standard PV 3905. The drop height of the ball is 65 cm. At least 10 test specimens are measured and the number of fractures is given in percent.

Bursting Pressure:

The bursting pressure of the manufactured mouldings is measured in accordance with DIN 73378 (1996) on hollow bodies with dimensions of 8 mm outside diameter and wall thickness of 1 mm.

Relative Viscosity:

DIN EN ISO 307 (2007), in 0.5 weight percent m-cresol solution or 1 weight percent sulphuric acid solution (polyamide 6) at a temperature of 20° C.

Thermal Behavior (melting point Tm, melting enthalpy and glass transition temperature (Tg): ISO standard 11357-1 (2016), -2 (2013) and -3 (2011), granules, the differential scanning calorimetry (DSC) is performed at a heating rate of 20° C./min.

TABLE 1

Compositions, in each case intermediate barrier layer of EVOH each with a thickness of 0.2 mm

| | | B1 | | VB1 | |
|---|---|---|---|---|---|
| | Unit | outer layer | Inner layer | outer layer | Inner layer |
| Layer Thickness | mm | 0.4 mm | 0.4 mm | 0.4 mm | 0.4 mm |
| polyamide 616 | weight % | 72.15 | — | — | — |
| polyamide 612 | weight % | — | — | 71.9 | — |
| polyamide 6 | weight % | — | 78.45 | — | 72.5 |
| SZM (Tafmer MC201) | weight % | 18.0 | — | 18.0 | 20.0 |
| SZM (Tafmer MH5020C) | weight % | — | 20.0 | — | — |
| WM (BBSA) | weight % | 8.0 | — | 10.0 | 6.0 |
| CuI/KI (1:6) | weight % | — | 0.05 | — | — |
| Black masterbatch | weight % | 1.25 | 1.4 | — | 1.4 |
| Stabilizer* | weight % | 0.6 | 0.1 | 0.1 | 0.1 |

*0.1 wt. % MgStearate and 0.5 wt. % Hostanox PAR24, obtainable from Clariant;

TABLE 2

| Property | Standard | Unit | B1 | VB1 |
|---|---|---|---|---|
| breaking stress, transverse to the direction of extrusion | VW TL 52712 | MPa | 21 | 18 |
| Elongation at break, transverse to extrusion direction | VW TL 52712 | % | 260 | 220 |
| Elongation at max. strain across | ISO 527 | % | 248 | 235 |
| Maximum tension across | ISO 527 | MPa | 41 | 36 |
| Yield strength, transverse to extrusion direction | VW TL 52712 | MPa | 37 | 32 |
| Maximum strain, longitudinal | ISO 527 | MPa | 53 | 50 |
| Elongation at max. strain along | ISO 527 | % | 395 | 262 |
| Yield stress in extrusion direction | VW TL 52712 | MPa | 33 | 28 |
| Elongation at break in extrusion direction | VW TL 52712 | % | 392 | 310 |
| Bursting Pressure | DIN 73378 | bar | 101 | 82 |
| Cold shock, −40° C., 500 g | VW TL 52712 | % | 0 | 40 |
| Cold shock, −40° C., 880 g | VW TL 52712 | % | 0 | 20 |
| Appearance 96 h, 60° C., FAM B | VW TL 52712 | | light flocculation | strong flocculation |
| Wash out quantity 96 h, 60° C., FAM B | VW TL 52712 | mg/dm2 | 25 | 337 |
| Zinc chloride resistance | SAE J2260 | | No cracks | Failed to pass |

FAM B: Test fuel according to SAE J1681 (2000)

It can be seen from the test values that the excellent mechanical properties of the pipes using the moulding compound according to the invention as the outer layer represent a significant improvement over those using the comparative moulding compound as the outer layer. This applies to all mechanical properties and especially to the cold impact resistance.

The washout resistance of the comparative test does not meet industrial requirements and the structure is not sufficiently resistant to zinc chloride. The suitability of the cable according to the invention for the application in the automotive sector is therefore impressively proven by the good mechanical properties as well as the wash-out quantity and the resistance to zinc chloride and is unexpected compared to the comparative example.

LIST OF REFERENCE SIGNS

1 Fuel line
2 Interior of 1
3 Inner layer
4 Middle layer
5 Outer layer
6 Outside surface of 1
7 Inner surface of 1

The invention claimed is:
1. A plastics line with at least one layer consisting of the following components:
   (A) 70-94 weight percent of a polyamide selected from the group consisting of: polyamide 516, polyamide 616, polyamide 1016, or mixtures thereof;
   (B) 4-20 weight percent impact modifier;
   (C) 2-15 weight percent of plasticiser;
   (D) 0-5 weight percent of additives different from (B) and (C), wherein the sum of (A)-(D) is 100 weight percent, and with the proviso that said layer does not contain polyamide 6.
2. The plastics line according to claim 1, wherein the at least one impact modifier (B) is selected as an ethylene-α-olefin copolymer modified with an acid.
3. The plastics line according to claim 1, wherein the proportion of impact modifier (B) is in the range of 5-18 weight percent.
4. The plastics line according to claim 1, wherein the at least one plasticizer (C) is selected as at least one of a hydroxybenzoic acid ester and a sulfonamide-based plasticizer.
5. The plastics line according to claim 1, wherein the proportion of plasticizer (C) is in the range of 2-9 weight percent.
6. The plastics line according to claim 1, wherein the at least one polyamide (A) is selected as polyamide 616, and/or wherein the polyamide (A) has a relative solution viscosity, measured in m-cresol according to ISO 307 at a temperature of 20° C., in the range of 2.0-2.4,
   and/or wherein the at least one polyamide (A) has a melting point in the range of 175-240° C.
7. The plastics line according to claim 1, wherein the proportion of additives (D) is in the range of 0.1-3 weight percent,
   and/or wherein additives (D) are selected from the group consisting of: antioxidants, processing aids, UV stabilizers, heat stabilizers, pigments, masterbatch carriers, conductivity additives, lubricants, or mixtures thereof.
8. The plastics line according to claim 1, wherein the plastics line is a multilayer composite in the form of a hollow body enclosing an inner space, and said layer forms an outer layer, which closes off the multilayer composite to the outside.
9. The plastics line according to claim 8, wherein it consists of two or three layers, an inner layer adjoining the inner space, in the case of two layers the said outer layer adjoining the inner layer and in the case of three layers a middle layer adjoining the inner layer and the said outer layer adjoining the middle layer.

10. The plastics line according to claim 9, wherein the inner layer comprises a copper stabilization, in a proportion in the range of 0.01-0.10 weight percent, and/or in that the inner layer contains an impact modifier,
wherein the weight percentages are each based on 100 weight percent of the material for producing the inner layer.

11. The plastics line according to claim 9, wherein the middle layer is formed on the basis of EVOH or consists of an EVOH.

12. The plastics line according to claim 9, wherein the inner layer comprises a copper stabilization, based on CuI, in a proportion in the range of 0.03-0.07 weight percent, and/or in that the inner layer contains an impact modifier, in a proportion in the range of 10-25 weight percent or in a range of 10-20 weight percent.

13. The plastics line according to claim 9, wherein the inner layer contains an impact modifier, being an ethylene/α-olefin copolymer grafted with an acid anhydride.

14. The plastics line according to claim 9, wherein the inner layer consists of:
(A_I) Polyamide 6, having a relative solution viscosity measured in sulphuric acid according to ISO 307 at a temperature of 20° C. in the range 3.5-3.8, or in the range of 3.6-3.75;
(B_I) 10-30 weight percent impact modifier;
(C_I) 0.01-0.1 weight percent heat stabilizer, based on copper (I);
(D_I) 0-1 weight percent of additives, selected from the group: conductivity additives, crystallization accelerators, processing aids, lubricants, and mixtures thereof;
the sum of the components (A_I)-(D_I) adding up to 100 weight percent of the material for producing the inner layer.

15. The plastics line according to claim 9, wherein the middle layer is formed on the basis of EVOH or consists of an EVOH, with an ethylene content in the range of 20-25 weight percent, or in the range of 25-30 weight percent.

16. The plastics line according to claim 9, wherein the total wall thickness of the multilayer composite is in the range of 0.5-2.5 mm, or in the range of 0.75-1.5 mm.

17. The plastics line according to one of the preceding claim 1, wherein the layer has a thickness in the range of 0.3-0.6 mm,
and, if present, the inner layer has a thickness in the range 0.3-0.6 mm,
and, if present, the middle layer has a thickness in the range 0.05-0.2 mm.

18. The plastics line according to claim 1, wherein it is manufactured in an extrusion process, extrusion blow moulding, tandem extrusion or a sheathing process, or in a co-extrusion process.

19. The plastics line according to claim 1 in the form of a line which can be designed at least in sections as a corrugated tube, as a line for combustion engines.

20. The plastics line according to claim 1, wherein the at least one impact modifier (B) is selected as an ethylene/α-olefin copolymer grafted with an acid anhydride.

21. The plastics line according to claim 1, wherein the at least one impact modifier (B) is selected as an ethylene/butylene, ethylene/propylene, or ethylene-propylene/ethylene-butylene copolymer modified or grafted with an acid anhydride.

22. The plastics line according to claim 1, wherein the at least one impact modifier (B) is selected as an ethylene/α-olefin copolymer grafted with a maleic anhydride.

23. The plastics line according to claim 1, wherein the proportion of impact modifier (B) is in the range of 10-16 weight percent or in the range of 12-15 weight percent.

24. The plastics line according to claim 1, wherein the at least one plasticizer (C) is selected as a N-substituted sulfonamide plasticizer.

25. The plastics line according to claim 1, wherein the at least one plasticizer (C) is selected as BBSA.

26. The plastics line according to claim 1, wherein the proportion of plasticizer (C) is in the range of 4-8 weight percent or 4.5-6 weight percent.

27. The plastics line according to claim 1, wherein the polyamide (A) has a relative solution viscosity, measured in m-cresol according to ISO 307 at a temperature of 20° C., in the range of 2.05-2.35,
and/or wherein the at least one polyamide (A) has a melting point in the range of 190-215° C. or 200-215° C.

28. The plastics line according to claim 1, wherein the proportion of additives (D) is in the range of 0.5-1 weight percent.

29. The plastics line according to claim 1, wherein it consists of two or three layers, an inner layer adjoining the inner space, in the case of two layers the said outer layer adjoining the inner layer and in the case of three layers a middle layer adjoining the inner layer and the said outer layer adjoining the middle layer,
wherein the inner layer is based on polyamide 6,
and wherein the middle layer is based on EVOH.

30. The plastics line according to claim 1, wherein the layer, when formed as an outer layer according to claim 9, has a thickness in the range of 0.3-0.6 mm, or in the range of 0.4-0.5 mm,
and, if present, the inner layer has a thickness in the range 0.3-0.6 mm, or in the range 0.4-0.5 mm,
and, if present, the middle layer has a thickness in the range 0.05-0.2 mm, or in the range 0.075-0.125 mm.

31. The plastics line according to claim 1, wherein it is manufactured in a continuous extrusion process, extrusion blow moulding, tandem extrusion or a sheathing process, or in the case of a plastic pipe according to claim 9, in a co-extrusion process.

32. The plastics line according to claim 1 in the form of a line which can be designed at least in sections as a corrugated pipe, as a line for combustion engines, in the automotive sector, for fuel, urea or coolant.

33. A method for producing a plastics line according to claim 1, wherein the at least one, or the two or three layers, are formed into a hollow body, in a continuous or discontinuous process.

34. A method for producing a plastics line according to claim 1, wherein the at least one, or in the case of a plastic pipe according to claim 9, the two or three layers, are formed into a pipe or a line or a container, in a continuous and/or discontinuous process, including in an extrusion blow moulding, a tandem extrusion, a sheathing process or a (co)extrusion process.

* * * * *